United States Patent Office 2,941,998
Patented June 21, 1960

2,941,998

16α,17α-HALO CONTAINING ACETAL AND KETAL DERIVATIVES OF 16α,17α-DIHYDROXYPROGESTERONE

Josef Fried, Princeton, N.J., assignor to Olin Mathieson Chemical Corporation, New York, N.Y., a corporation of Virginia No Drawing. Filed Nov. 18, 1958, Ser. No. 774,615

7 Claims. (Cl. 260—239.55)

This invention relates to, and has for its object the provision of, a method of preparing physiologically active steroids, and to the physiologically active steroids produced thereby.

The steroids of this invention include the 16α,17α-acetal and ketal derivatives of 16α,17α-dihydroxyprogesterone and haloalkanones or haloalkanals, and more particularly steroids of the general formula

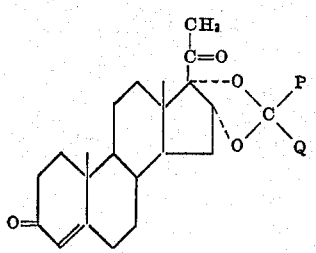

wherein P is hydrogen, a lower alkyl radical, or a halo lower alkyl radical; and Q is a halo lower alkyl radical.

The compounds of this invention are prepared by interacting 16α,17α-dihydroxyprogesterone with an aldehyde or ketone of the formula:

wherein P and Q are as above-defined, and recovering the resultant acetal or ketal derivative. The reaction is preferably carried out by treating a suspension or solution of the steroid in the aldehyde or ketone (or an organic solvent if the aldehyde or ketone is a solid) with an acid catalyst (e.g. perchloric acid, p-toluenesulfonic acid, hydrochloric acid, etc.) neutralizing the acid and recovering the acetal or ketal derivative formed.

Suitable aldehyde and ketone reactants include haloalkanals, particularly halo-lower alkanals, such as chloral hydrate, trifluoroacetaldehyde hemiacetal, and heptafluorobutanal ethyl hemiacetal; and haloalkanones, particularly halo-lower alkanones, such as 1,1,1-trifluoroacetone.

All of the compounds of this invention are physiologically-active substances which possess progestational activity and hence can be used in lieu of known progestational steroids such as progesterone in the treatment of habitual or threatened abortion, amenorrhea, and premenstrual tension, for which purpose can be administered in the same manner as progesterone, for example, the dosage being adjusted for the relative potency of the particular steroid.

The following examples are illustrative of the invention (all temperatures being in centigrade):

EXAMPLE 1

*16α,17α-chloral derivative of 16α,17α-dihydroxyprogesterone*

To a suspension of 500 mg. of 16α,17α-dihydroxyprogesterone and 4 grams of chloral hydrate in 20 ml. of dioxane is added 0.1 ml. of 72% perchloric acid and the mixture agitated at room temperature for 24 hours. The mixture is filtered to remove some unreacted triamcinolone neutralized with sodium bicarbonate solution and extracted with chloroform. The chloroform dioxane extract is washed with water, dried over sodium sulfate and the solvents removed in vacuo. The residue represents the chloral derivative of 16α,17α-dihydroxyprogesterone.

EXAMPLE 2

*1,1,1-trifluoroacetonide of 16α,17α-dihydroxyprogesterone*

To a suspension of 300 mg. of 16α,17α-dihydroxyprogesterone in 3 ml. of dioxane and 3 ml. of redistilled 1,1,1-trifluoroacetone is added at 10° 0.03 ml. of 72% perchloric acid. The reaction vessel is closed and the mixture agitated for 2½ hours at room temperature. At the end of this period the mixture is neutralized with dilute sodium bicarbonate solution and extracted with chloroform. The chloroform-dioxane extract is washed with water, dried over sodium sulfate and the solvents removed in vacuo. The residual crystalline material is recrystallized from acetone-hexane.

EXAMPLE 3

*Heptafluorobutanal derivative of 16α,17α-dihydroxyprogesterone*

To a suspension of 100 mg. of 16α,17α-dihydroxyprogesterone in 5 ml. of heptafluorobutanal ethyl hemiacetal is added 0.05 ml. of 72% perchloric acid, and the mixture stirred at room temperature for two hours. The resulting solution is neutralized with sodium bicarbonate solution and after addition of water, the excess reagent is evaporated in vacuo. The resulting crystals are filtered, washed with water and dried in vacuo.

The invention may be variously otherwise embodied within the scope of the appended claims.

What is claimed is:

1. A steroid of the general formula

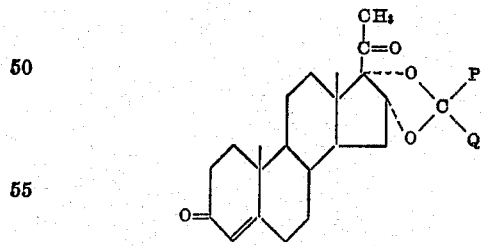

wherein P is selected from the group consisting of hydrogen, lower alkyl and halo lower alkyl; and Q is halo lower alkyl.

2. The steroid of claim 1, wherein P is hydrogen.
3. The steroid of claim 1, wherein P is lower alkyl.
4. The steroid of claim 1, wherein P is halo lower alkyl.
5. 16α,17α-chloral derivative of 16α,17α-dihydroxyprogesterone.
6. 16α,17α-1,1,1-trifluoroacetonide of 16α,17α-dihydroxyprogesterone.
7. 16α,17α-heptafluorobutanal derivative of 16α,17α-dihydroxyprogesterone.

No references cited.